US012710707B2

(12) United States Patent
Kikuchi

(10) Patent No.: US 12,710,707 B2
(45) Date of Patent: Aug. 18, 2026

(54) IMAGE FORMING APPARATUS CAPABLE OF SUSPENDING IMAGE FORMATION OF IMAGE FORMING DEVICE WHEN ACCESS COVER IS OPEN

(71) Applicant: KYOCERA Document Solutions Inc., Osaka (JP)

(72) Inventor: Ryota Kikuchi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/948,870

(22) Filed: Nov. 15, 2024

(65) Prior Publication Data

US 2025/0164908 A1 May 22, 2025

(30) Foreign Application Priority Data

Nov. 17, 2023 (JP) ................................ 2023-195959

(51) Int. Cl.

*G03G 15/08* (2006.01)
*G03G 15/00* (2006.01)
*G03G 21/16* (2006.01)

(52) U.S. Cl.

CPC ..... *G03G 15/0868* (2013.01); *G03G 15/0856* (2013.01); *G03G 15/0863* (2013.01); *G03G 15/556* (2013.01); *G03G 21/1633* (2013.01); *G03G 2215/0675* (2013.01); *G03G 2215/0695* (2013.01)

(58) Field of Classification Search

CPC ........... G03G 15/0856; G03G 15/0863; G03G 15/0868; G03G 15/5016; G03G 15/556; G03G 21/1633; G03G 21/1821; G03G 21/1882; G03G 21/1892

See application file for complete search history.

(56) References Cited

U.S. PATENT DOCUMENTS

| | | | |
|---|---|---|---|
| 2012/0294634 | A1 | 11/2012 | Nishikawa |
| 2017/0315501 | A1 | 11/2017 | Mochizuki et al. |
| 2019/0086832 | A1 | 3/2019 | Nohara et al. |
| 2019/0086835 | A1 | 3/2019 | Nohara et al. |
| 2019/0302689 | A1 | 10/2019 | Suzuki et al. |

FOREIGN PATENT DOCUMENTS

| | | | |
|---|---|---|---|
| JP | H0980842 | A | 3/1997 |
| JP | 2019056802 | A | 4/2019 |
| JP | 2022022444 | A | 2/2022 |

*Primary Examiner* — Hoang X Ngo
(74) *Attorney, Agent, or Firm* — IP Busiiness Solutions, LLC.

(57) ABSTRACT

An image forming apparatus includes an image forming device, a container loading portion, a plurality of toner sensors, an access cover, an open/close sensor, and a control device that functions as a controller. The container loading portion is capable of being loaded with a plurality of toner containers containing the toner of the same color to be supplied to the image forming device. The access cover makes an opening/closing movement to open or close an interior of the container loading portion in replacing each of the toner containers loaded into the container loading portion. When, during execution of image formation of the image forming device, the open/close sensor detects that the access cover is open and none of the plurality of toner sensors detects an empty state of the associated toner container, the controller suspends the image formation of the image forming device.

5 Claims, 6 Drawing Sheets

IMAGE FORMING APPARATUS CAPABLE OF SUSPENDING IMAGE FORMATION OF IMAGE FORMING DEVICE WHEN ACCESS COVER IS OPEN

INCORPORATION BY REFERENCE

This application claims priority to Japanese Patent Application No. 2023-195959 filed on 17 Nov. 2023, the entire contents of which are incorporated by reference herein.

BACKGROUND

The present disclosure relates to image forming apparatuses equipped with a mechanism into which a plurality of toner containers containing the same color toner are loaded.

A general image forming apparatus includes: an image forming device that forms an electrostatic latent image on the surface of an image carrier, gives a toner to the electrostatic latent image on the surface of the image carrier to develop the electrostatic latent image into a toner image, and transfers the toner image from the image carrier to a recording paper sheet; and a toner container containing the toner to be supplied to the image forming device. When, in such an image forming apparatus, the toner container becomes empty, the toner container is replaced with image formation of the image forming device suspended or stopped.

For example, there is known a first technique in which a toner supply unit is separated into a toner cartridge and a toner hopper and, upon replacement of the toner cartridge having become empty, a slight amount of toner remaining in the toner hopper is supplied in order to continue image formation.

For another example, there is known a second technique in which two tonner containers capable of supplying the same color toner are provided for each color and when one of the two toner containers containing the same color toner becomes empty and needs to be replaced, toner is supplied from the other of the two toner containers in order to continue image formation.

SUMMARY

A technique improved over the aforementioned techniques is proposed as one aspect of the present disclosure.

An image forming apparatus according to an aspect of the present disclosure includes an image forming device, a container loading portion, a plurality of toner sensors, an access cover, an open/close sensor, and a control device. The image forming device forms an image formed of a toner on a recording paper sheet. The container loading portion is capable of being loaded with a plurality of toner containers containing the toner of the same color to be supplied to the image forming device. The plurality of toner sensors detect whether the plurality of respective toner containers loaded into the container loading portion are in an empty state. The access cover makes an opening/closing movement to open or close an interior of the container loading portion in replacing each of the toner containers loaded into the container loading portion. The open/close sensor detects whether the access cover is open or closed. The control device includes a processor and functions as a controller through the processor executing a control program. When, during execution of image formation of the image forming device, the open/close sensor detects that the access cover is open and none of the plurality of toner sensors detects an empty state of the associated toner container, the controller suspends the image formation of the image forming device.

DETAILED DESCRIPTION

Figure 1:
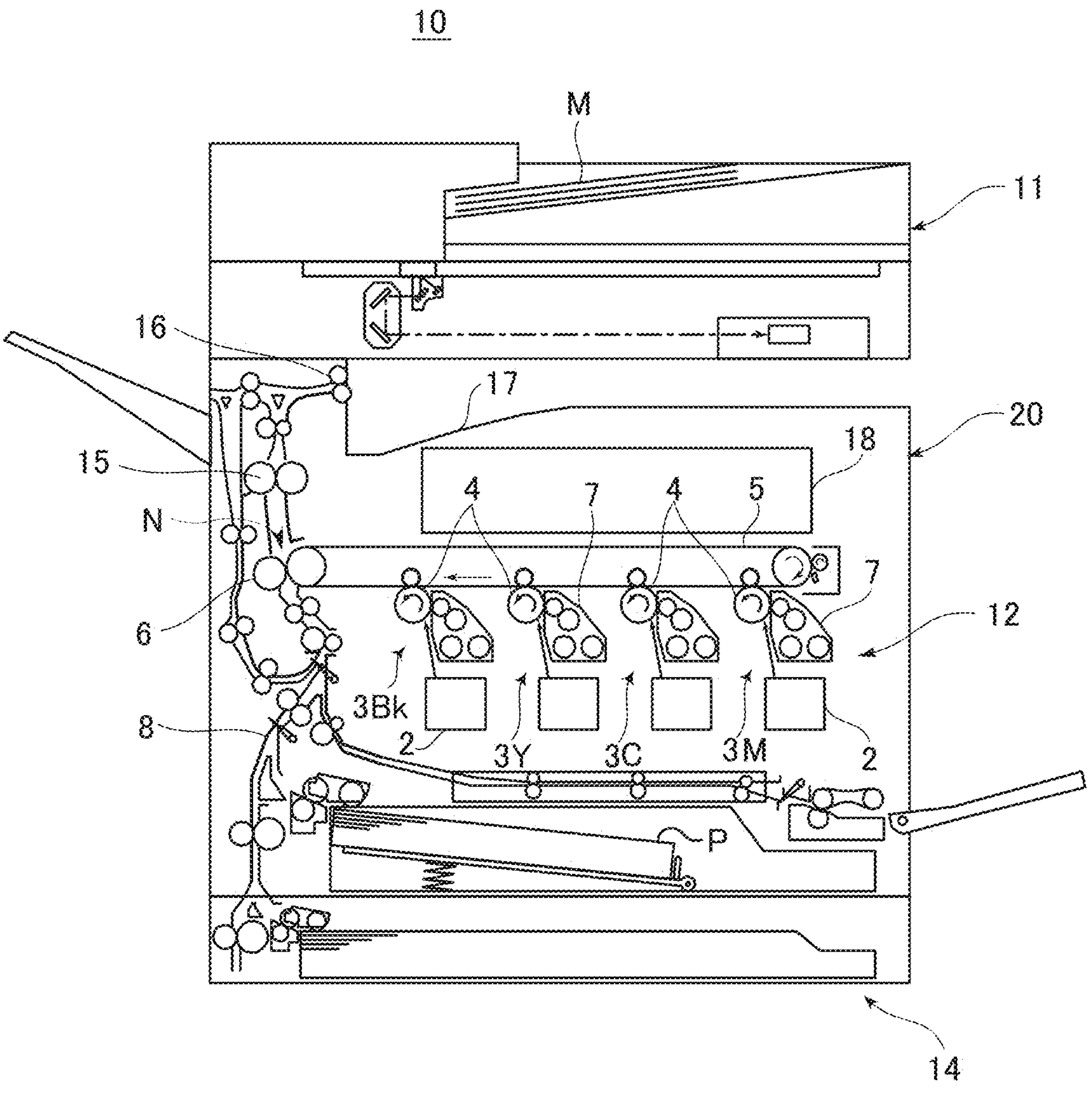
FIG. 1 is a cross-sectional view showing an image forming apparatus.

Hereinafter, a description will be given of an image forming apparatus according to one embodiment of the present disclosure with reference to the drawings. FIG. 1 is a cross-sectional view showing an image forming apparatus 10 according to the one embodiment of the present disclosure. As shown in FIG. 1, the image forming apparatus 10 is, for example, an MFP (multifunction peripheral) combining a plurality of functions, such as a copy function and a print function. The image forming apparatus 10 includes an image reading device 11 and an image forming device 12.

The image reading device 11 includes an image pickup device (such as a CCD (charge coupled device) sensor or a CIS (contact image sensor)) capable of optically reading an image of an original document M. The image reading device 11 generate image date representing the image of the original document M from an output of the image pickup device.

The image forming device 12 forms an image represented by the image data on a recording paper sheet P. The image forming device 12 includes an image forming unit 3M for magenta, an image forming unit 3C for cyan, an image forming unit 3Y for yellow, and an image forming unit 3Bk for black. Each of these image forming units 3M, 3C, 3Y, and 3Bk uniformly charges the surface of a photosensitive drum 4, exposes the surface of the photosensitive drum 4 to light with an exposure device 2 to form an electrostatic latent image on the surface of the photosensitive drum 4, develops the electrostatic latent image on the surface of the photosensitive drum 4 into a toner image (an image formed of a toner) with a developing device 7, and primarily transfers the toner image on the surface of the photosensitive drum 4 to an intermediate transfer belt 5. Thus, a multicolor toner image is formed on the intermediate transfer belt 5. This multicolor toner image is secondarily transferred, at a nip region N between the intermediate transfer belt 5 and a secondary transfer roller 6, to a recording paper sheet P conveyed from a sheet feed device 14 via a conveyance path 8.

A fixing device 15 applies heat and pressure to the recording paper sheet P to fix the toner image on the recording paper sheet P by heat and pressure. The recording paper sheet P is discharged through an ejection roller 16 to a sheet output tray 17.

Above the image forming units 3M, 3C, 3Y, and 3Bk in FIG. 1, a container loading portion 18 is provided which serves as a toner supply device that supplies a magenta toner, a cyan toner, a yellow toner, and a black toner to the respective developing devices 7 of the image forming units 3M, 3C, 3Y, and 3Bk, respectively.

Figure 2:
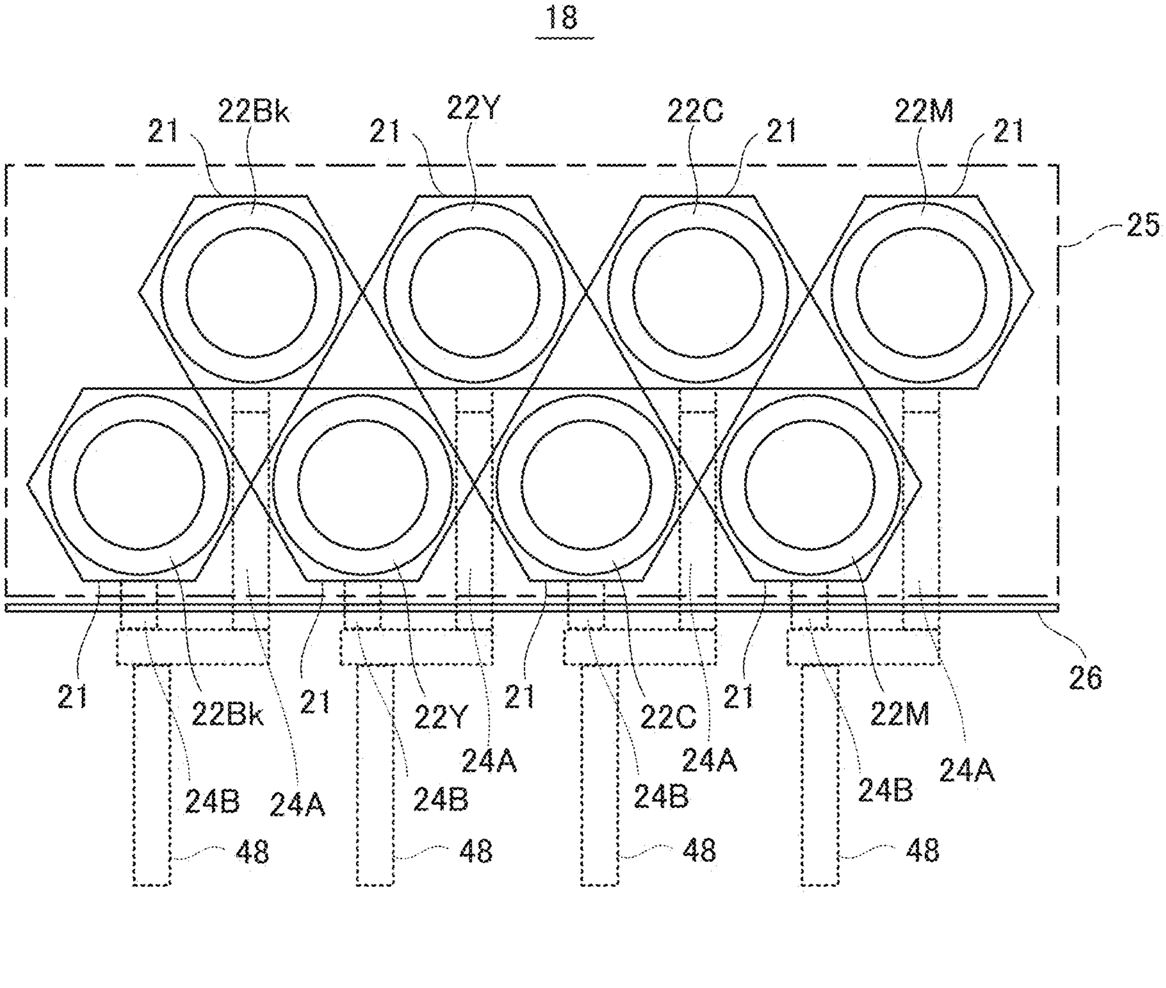
FIG. 2 is a front view schematically showing a tonner supply device.
Figure 3:
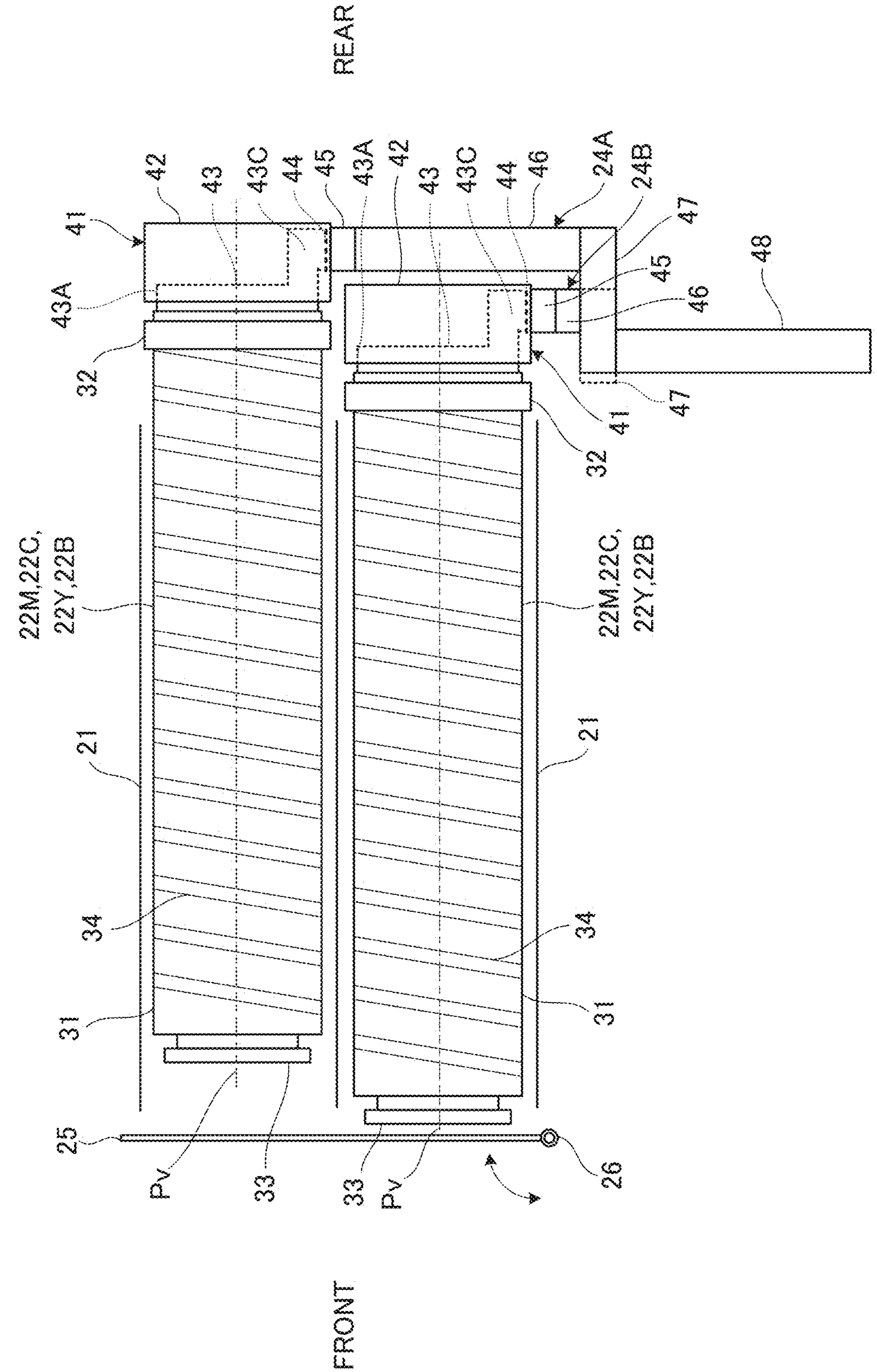
FIG. 3 is a side view schematically showing the toner supply device.

FIG. 2 is a front view schematically showing the container loading portion 18 when viewed from in front (the front side) of the image forming apparatus 10. FIG. 3 is a side view schematically showing the interior of the container loading portion 18.

The container loading portion 18 is provided in an apparatus body 20 of the image forming apparatus 10. The container loading portion 18 includes: for example, eight hexagonal tubular housings 21; a plurality of pairs of toner conveyance units 24A, 24B, each pair provided for a pair of toner containers for the same toner color; and an access cover 25. Respective toner containers are removably fitted into the tubular housings 21.

The container loading portion 18 has a structure that accommodates two toner containers 22M for magenta, two toner containers 22C for cyan, two toner containers 22Y for yellow, and two toner containers 22Bk for black (eight containers in total). A pair of toner conveyance units 24A, 24B are provided for each of the pair of toner containers 22M, the pair of toner containers 22C, the pair of toner containers 22Y, and the pair of toner containers 22Bk.

As shown in FIG. 2, in the container loading portion 18, the eight hexagonal tubular housings 21 in total are stacked in upper and lower two tiers when viewed from in front. As shown in FIGS. 2 and 3, the upper four tubular housings 21 are fitted with four cylindrical toner containers 22M, 22C, 22Y, and 22Bk horizontally inserted therein. The lower four tubular housings 21 are fitted with four cylindrical toner containers 22M, 22C, 22Y, and 22Bk horizontally inserted therein.

The upper toner container 22M and the lower toner container 22M are adjacent diagonally one above the other, contain a magenta toner, and supply the magenta toner via the respective toner conveyance units 24A and 24B to the developing device 7 of the image forming unit 3M.

The upper toner container 22C and the lower toner container 22C are adjacent diagonally one above the other, contain a cyan toner, and supply the cyan toner via the respective toner conveyance units 24A and 24B to the developing device 7 of the image forming unit 3C.

The upper toner container 22Y and the lower toner container 22Y are adjacent diagonally one above the other, contain a yellow toner, and supply the yellow toner via the respective toner conveyance units 24A and 24B to the developing device 7 of the image forming unit 3Y.

The upper toner container 22Bk and the lower toner container 22Bk are adjacent diagonally one above the other, contain a black toner, and supply the black toner via the respective toner conveyance units 24A and 24B to the developing device 7 of the image forming unit 3Bk.

The access cover 25 is supported pivotally about a support rod 26 provided at and along the lower side thereof to freely open and close with respect to the container loading portion 18. When pivotally moved down toward the front side of the image forming apparatus 10, the access cover 25 becomes open. With the access cover 25 open, each toner container can be replaced. In other words, the access cover 25 makes an opening/closing movement to open or close the interior of the container loading portion 18 in replacing each of the toner containers loaded into the container loading portion 18.

Each toner container 22M, 22C, 22Y, and 22Bk includes a hollow cylindrical container 31 and a support 41. A toner is contained in the interior of the hollow cylindrical container 31. The cylindrical container 31 is loaded, with its rear end open and its front end closed, into the tubular housing 21. Each toner container 22M, 22C, 22Y, and 22Bk is provided, at the outer periphery of one end (the rear end when loaded) of the cylindrical container 31, with a gear 32 rotatable simultaneously with the cylindrical container 31 and provided, at an end surface of the other end (the front end when loaded) of the cylindrical container 31, with a knob 33.

The outer periphery of the cylindrical container 31 has a spiral groove 34 formed therein. The spiral groove 34 forms a spiral protrusion that protrudes toward the interior of the cylindrical container 31. In the interior of the tubular housing 21, the cylindrical container 31 is supported rotatably about a rotational axis Pv extending in a lengthwise direction of the cylindrical container 31. The gear 32 at the rear end of the cylindrical container 31 meshes with a drive gear mounted to the apparatus body 20. When the gear 32 rotates by a rotational drive force of the drive gear, the cylindrical container 31 also rotates. With the rotation of the cylindrical container 31, the toner in the cylindrical container 31 is conveyed toward the rear end of the cylindrical container 31 by the spiral protrusion protruding toward the interior of the cylindrical container 31.

The support 41 includes a case 42, a fitting lid 43, and a shutter 44. With the toner container inserted and loaded into the tubular housing 21, the case 42 and the fitting lid 43 are connected to the toner conveyance unit 24A or 24B.

The fitting lid 43 includes: a cylindrical portion 43A rotatably fittable into a rear end opening of the cylindrical container 31; and a toner ejection port 43C provided at the bottom of the cylindrical portion 43A, and the cylindrical portion 43A is closed at the rear end. The outer periphery of the cylindrical portion 43A is fitted rotatably and tightly into the inner periphery of the rear end opening of the cylindrical container 31. Thus, a structure is formed in which even when the cylindrical container 31 rotates, the cylindrical portion 43A does not rotate and the toner is kept from leaking from between the cylindrical container 31 and the cylindrical portion 43A.

The shutter 44 is provided at the toner ejection port 43C of the fitting lid 43. When the toner container is inserted and loaded into the tubular housing 21, the shutter 44 is moved to open the toner ejection port 43C. When the toner container is pulled out of the tubular housing 21, the shutter 44 is moved in the opposite direction to close the toner ejection port 43C.

When, with the rotation of the cylindrical container 31, the toner in the cylindrical container 31 is conveyed to the rear end of the cylindrical container 31 by the spiral protrusion protruding toward the interior of the cylindrical container 31, the toner is led to the interior of the cylindrical portion 43A of the fitting lid 43 and then ejected downward through the toner ejection port 43C of the fitting lid 43.

The toner conveyance units 24A and 24B fixed to the image forming apparatus 10 side include respective toner receivers 45, respective vertical conveyance pipes 46, respective horizontal conveyance pipes 47, and a common junction conveyance pipe 48. The toner receiver 45 of the toner conveyance unit 24A is engaged with the toner ejection port 43C of the fitting lid 43 of the upper toner container. The toner receiver 45 of the toner conveyance unit 24B is engaged with the toner ejection port 43C of the fitting lid 43 of the lower toner container.

Each toner conveyance unit 24A, 24B receives via the toner receiver 45 the toner ejected through the toner ejection port 43C of the fitting lid 43 of the associated toner container and leads it through the vertical conveyance pipe 46 to the horizontal conveyance pipe 47. In the vertical conveyance pipe 46, the toner is conveyed by free fall. In the horizontal conveyance pipe 47, a screw provided inside of the horizontal conveyance pipe 47 is driven into rotation to convey the toner horizontally.

In each pair of toner conveyance units 24A, 24B that receive the same color toner through the toner ejection ports 43C of the upper and lower toner containers adjacent diagonally one above the other as shown in FIG. 2, their respective horizontal conveyance pipes 47 are connected to the upper end of the junction conveyance pipe 48. The toners flowing through the horizontal conveyance pipes 47 are led to the junction conveyance pipe 48 to merge and supplied through the junction conveyance pipe 48 to the developing device 7.

Thus, the magenta toners contained in the upper and lower toner containers 22M are supplied through the associated toner conveyance units 24A, 24B to the developing device 7 of the image forming unit 3M. The cyan toners contained in the upper and lower toner containers 22C are supplied through the associated toner conveyance units 24A, 24B to the developing device 7 of the image forming unit 3C.

The yellow toners contained in the upper and lower toner containers 22Y are supplied through the associated toner conveyance units 24A, 24B to the developing device 7 of the image forming unit 3Y. The black toners contained in the upper and lower toner containers 22Bk are supplied through the associated toner conveyance units 24A, 24B to the developing device 7 of the image forming unit 3Bk.

Figure 4:
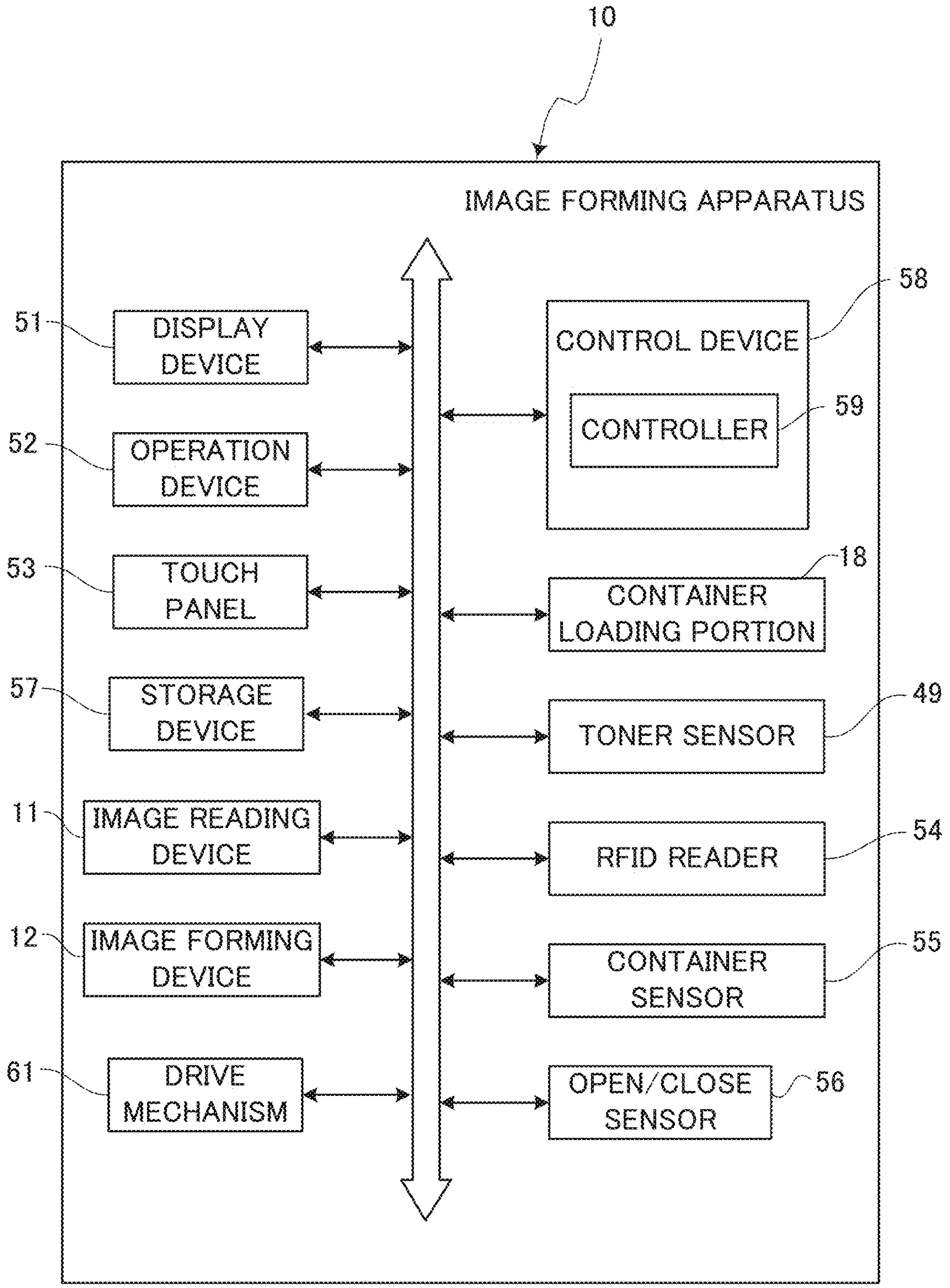
FIG. 4 is a block diagram showing the configuration of the image forming apparatus.

Each of paired toner conveyance units 24A, 24B for each color is provided at the vertical conveyance pipe 46 with a toner sensor 49 (see FIG. 4). The toner sensor 49 is, for example, a magnetic permeability sensor and detects the toner in the interior of the vertical conveyance pipe 46.

When the toner sensor 49 at the vertical conveyance pipe 46 of the toner conveyance unit 24A that receives toner from the upper toner container detects no toner in the interior of the vertical conveyance pipe 46, the upper toner container is empty. When the toner sensor 49 at the vertical conveyance pipe 46 of the toner conveyance unit 24B that receives toner from the lower toner container detects no toner in the interior of the vertical conveyance pipe 46, the lower toner container is empty.

A more detailed structure of the container loading portion 18 is described, for example, in the publications of Japanese Patent Applications Nos. 2022-22444 and 2019-56802 both filed by the Applicant of the present application.

FIG. 4 is a functional block diagram showing an essential internal configuration of the image forming apparatus 10. As shown in FIG. 4, the image forming apparatus 10 includes the image reading device 11, the image forming device 12, the container loading portion 18, the plurality of toner sensors 49, a display device 51, an operation device 52, a touch panel 53, a plurality of RFID readers 54, a plurality of container sensors 55, an open/close sensor 56, a storage device 57 a control device 58, and a drive mechanism 61. These components are capable of data or signal transfer via a bus among them.

The display device 51 is formed of a liquid crystal display (LCD), an organic EL (organic light-emitting diode (OLED)) display or the like.

The operation device 52 includes physical keys, including numeric keys, an Enter key, and a Start key. The operation device 52 accepts inputs of various instructions based on user's operations on the keys. The touch panel 53 is a portion of the operation device 52.

The touch panel 53 is disposed over the screen of the display device 51. The touch panel 53 is a touch panel of a resistive film system, a capacitance system or any other system. The touch panel 53 detects a touch on the touch panel 53 with a user's finger or the like, together with a point of the touch, and outputs a detection signal indicating the coordinate of the point of touch to a later-described controller 59 of the control device 58 and so on.

The RFID (radio frequency identification) readers 54 are provided one for each of paired tubular housings 21 for each color. The RFID readers 54 read information from respective RF tags attached to the respective toner containers inserted into the respective tubular housings 21. In other words, every toner container is provided with an RF tag including a storage medium. Information on the associated toner container is stored in the RF tag.

The container sensors 55 are provided one for each of paired tubular housings 21 for each color. The container sensor 55 detects the presence or absence of the toner container inserted in the associated tubular housing 21. The container sensor 55 is, for example, a limit switch that turns on and off according to the insertion and removal of the toner container.

The open/close sensor 56 detects whether the access cover 25 of the container loading portion 18 is open or closed. The open/close sensor 56 is, for example, a limit switch that turns on and off according to the opening and closing of the access cover 25.

The storage device 57 is a large storage device, such as an SSD (solid state drive) or an HDD (hard disk drive). The storage device 57 holds various types of application programs and various types of data.

The control device 58 is made up of a processor, a RAM (random access memory), a ROM (read only memory), and so on. The processor is, for example, a CPU (central processing unit), an ASIC (application specific integrated circuit) or an MPU (micro processing unit). When a control program stored in the above-mentioned ROM or storage device 57 is executed by the above processor, the control device 58 functions as a controller 59.

The controller 59 provides overall control of the image forming apparatus 10. The control device 58 is connected to the image reading device 11, the image forming device 12, the display device 51, the container loading portion 18, each of the toner sensors 49, the operation device 52, the touch panel 53, each of the RFID readers 54, each of the container sensors 55, the open/close sensor 56, the storage device 57, the drive mechanism 61, and so on. The controller 59 performs operation control on each of the above components and signal or data transfer to and from each of the components.

The controller 59 serves as a processor that executes various types of processing necessary for image formation by the image forming apparatus 10. The controller 59 accepts an operational instruction input by a user, based on a detection signal output from the touch panel 53 or operation on a physical key of the operation device 52.

For example, the controller 59 accepts through the touch panel 53 a touch gesture on a GUI (graphical user interface) or the like being displayed on the screen of the display device 51. The controller 59 has the function of controlling the display operation of the display device 51.

The controller 59 performs, through the RFID readers 54, reading and writing of information from and to the respective RF tags of the toner containers inserted into the tubular housings 21.

The controller 59 determines, based on respective detected outputs from the container sensors 55, the presence or absence of each of the toner containers inserted into the tubular housings 21.

The controller 59 controls the driving of the drive mechanism 61 including respective motors that rotationally drive respective drive gears meshed with the respective gears 32 of the toner containers in the container loading portion 18, thus rotating the toner containers.

The controller 59 controls the driving of respective motors (provided in the drive mechanism 61) that rotationally drive respective screws inside of the horizontal conveyance pipes 47 of the respective toner conveyance units 24A, 24B in the container loading portion 18, thus allowing each screw to convey the toner and allowing the toner coming from the associated toner container to be supplied to the associated developing device 7. In doing so, for each pair of upper and lower toner containers containing the same color toner, the controller 59 allows the toner in one of the upper and lower toner containers to be supplied to the associated developing device 7.

The controller 59 determines, based on detected outputs of the respective toner sensors 49 provided at the respective vertical conveyance pipes 46 of all the toner conveyance units 24A, 24B in the container loading portion 18, whether each of the upper and lower toner containers is empty.

The controller 59 determines, based on a detected output of the open/close sensor 56, whether the access cover 25 of the container loading portion 18 is open or closed.

In the image forming apparatus 10 having the above structure, for example, the user places an original document M in the image reading device 11 and operates the Start key of the operation device 52 to input an image formation instruction to form an image. Thus, in accordance with the image formation instruction, the controller 59 allows the image reading device 11 to read the image of the original document M and allows the image forming device 12 to form the image of the original document M on a recording paper sheet P.

In this embodiment, the container loading portion 18 supplies toner in a dual mode where both the upper and lower toner containers containing the same color toner are used, or in a single mode where only one of the upper and lower toner containers for the same color toner is used. Under the control of the controller 59, the container loading portion 18 operates in accordance with the dual mode or the single mode.

For example, the user touches the GUI being displayed on the display device 51 to input to the operation device 52 an execution instruction to execute the dual mode or an execution instruction to execute the single mode. The controller 59 allows the container loading portion 18 to operate in the dual mode or the single mode indicated by the input execution instruction. In other words, in accordance with the user's instruction, the controller 59 switches the operation of the container loading portion 18 to either the dual mode or the single mode and allows the container loading portion 18 to operate in the switched mode.

In allowing the container loading portion 18 to operate in the dual mode, for each pair of upper and lower toner containers containing the same color toner in FIG. 2, the controller 59 allows the toner in one of the upper and lower toner containers to be supplied to the associated developing device 7. The controller 59 determines, based on a detected output of the toner sensor 49 provided at the vertical conveyance pipe 46 of the toner conveyance unit for the one toner container that supplies the toner, whether the one toner container has become empty.

When determining that the one toner container has become empty, the controller 59 allows the other of the pair of upper and lower toner containers to supply the toner to the developing device 7. Thus, even when one of the pair of upper and lower toner containers becomes empty, toner supply to the developing device 7 is continued without cessation. Therefore, in the dual mode, while toner is supplied from one of the pair of upper and lower toner containers, the other toner container having become empty can be replaced, which prevents suspension of image formation of the image forming device 12.

In allowing the container loading portion 18 to operate in the single mode, for each pair of upper and lower toner containers containing the same color toner in FIG. 2, the controller 59 selects one of the pair of upper and lower toner containers from which a toner of the color is to be supplied, for example, in accordance with an instruction input to the operation device 52 and allows only a set of single-tier toner containers containing different color toners to supply the toners. The controller 59 determines, based on a detected output of the toner sensor 49 provided at the vertical conveyance pipe 46 of the toner conveyance unit for each toner container being used as a supply source of toner, whether the toner container has become empty.

When determining that any one of the set of toner containers has become empty, the controller 59 suspends or stops image formation of the image forming device 12 until the toner container having become empty is replaced. When the empty toner container is replaced and the controller 59 determines, from a detected output of the toner sensor 49, that toner exists in the replaced toner container, the controller 59 allows the image forming device 12 to restart the image formation.

While the image forming device 12 performs image formation, the controller 59 determines, based on a detected output of the open/close sensor 56, whether the access cover 25 of the container loading portion 18 is open or closed. When determining that the access cover 25 is open, the controller 59 further determines, based on detected outputs of the respective toner sensors 49 provided at the respective vertical conveyance pipes 46 of all the toner conveyance units 24A, 24B, whether each of the toner containers is empty. Based on the determination result, the controller 59 controls the image forming device 12 to suspend, continue or restart image formation.

Figure 5A:
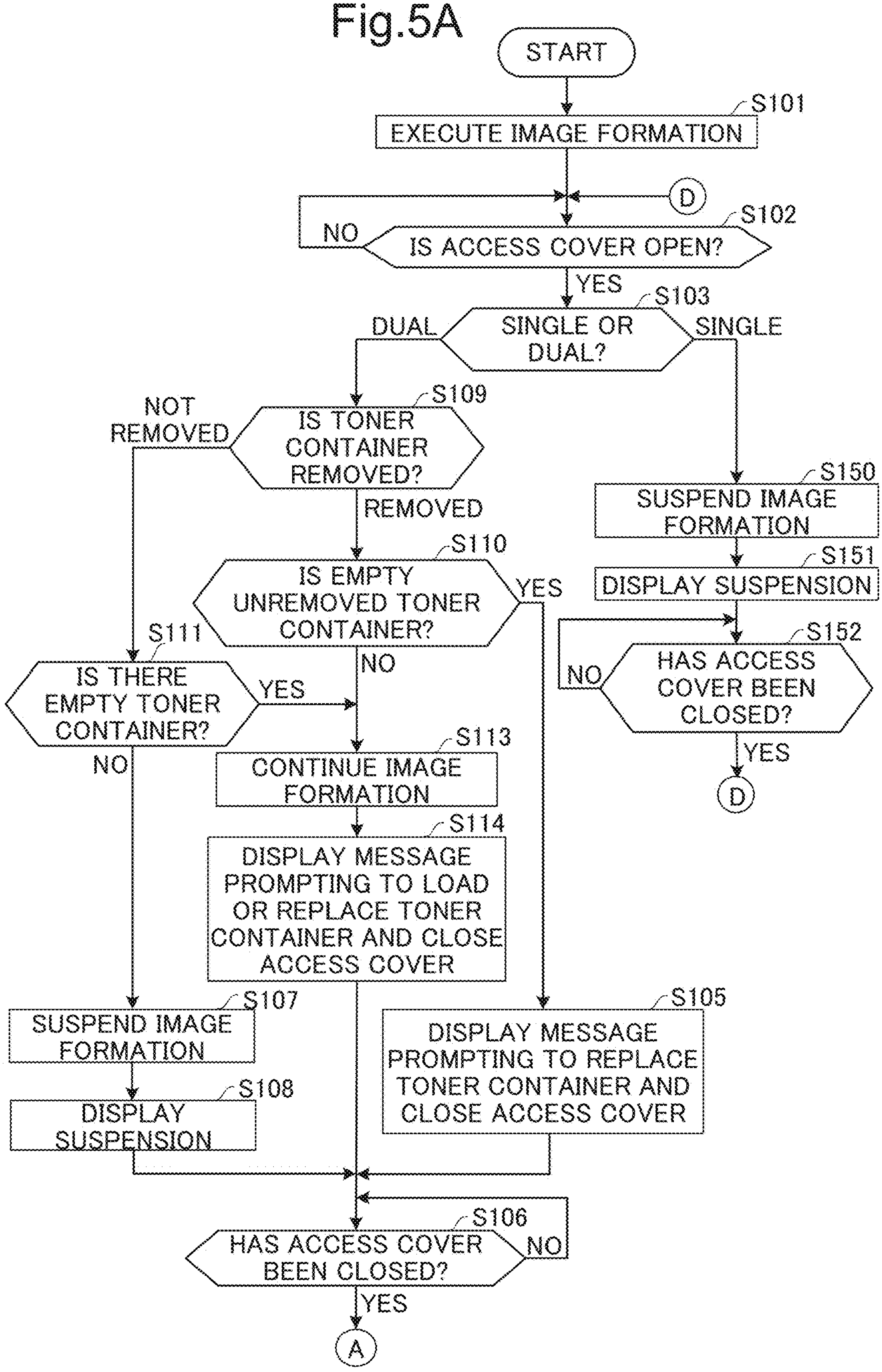
FIGS. 5A and 5B show a flowchart showing the control of an image forming operation when an access cover is open.
Figure 5B:
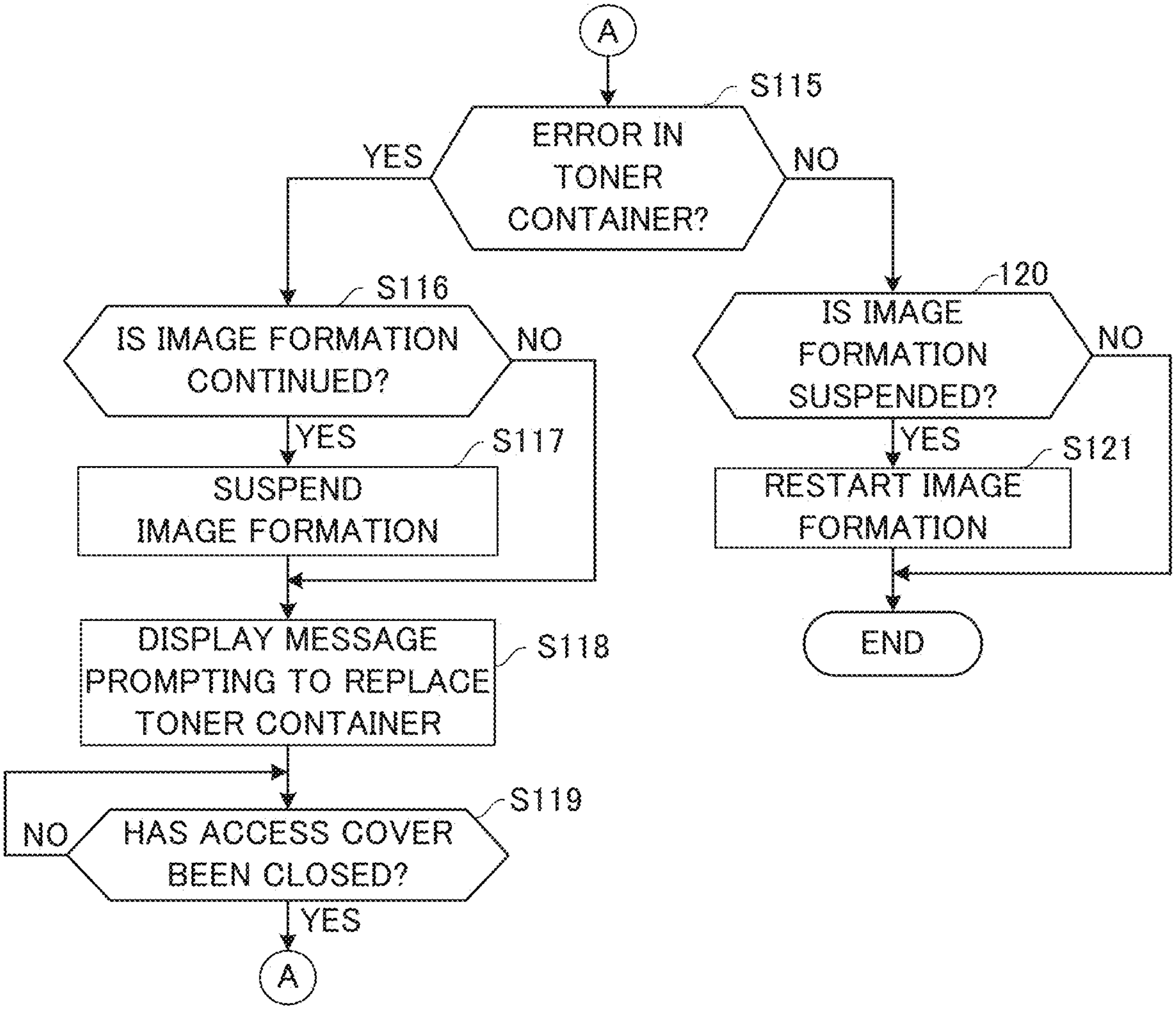

Next, a description will be given of the control of the image forming operation of the image forming device 12 when the access cover 25 is open. FIGS. 5A and 5B show a flowchart showing the control of the image forming operation of the image forming device 12 when the access cover 25 is open.

While allowing the image forming device 12 to perform image formation (step S101), the controller 59 determines, based on a detected output of the open/close sensor 56, whether the access cover 25 of the container loading portion 18 is open or closed (step S102). When determining that the access cover 25 is open ("Yes" in step S102), the controller 59 determines whether it allows the container loading portion 18 to operate in the single mode or the dual mode (step S103). As described previously, the controller 59 allows the container loading portion 18 to operate in the single mode or the dual mode in accordance with a user's instruction.

For example, when the controller 59 determines that it allows the container loading portion 18 to operate in the single mode ("Single" in step S103), the controller 59 forcibly suspends image formation of the image forming device 12 (step S150) and allows the display device 51 to display on the screen a predetermined message indicating that the image formation has been suspended (step S151).

The controller 59 continues the suspension of the image formation of the image forming device 12 (step S150) so long as it determines, based on a detected output of the open/close sensor 56, that the access cover 25 has not been closed ("No" in step S152). When determining that the access cover 25 has been closed ("Yes" in step S152), the controller 59 goes back to the processing in step S102.

On the other hand, when the controller 59 determines that it allows the container loading portion 18 to operate in the dual mode ("Dual" in step S103), the controller 59 determines, based on a detected output of the container sensor 55 for each of the upper and lower eight toner containers, whether or not the toner container is removed (step S109).

When determining that the toner container is removed ("Removed" in step S109), the controller 59 determines that the other unremoved toner container paired with the removed toner container and containing the same color toner as the removed toner container is a supply source of the toner, and further determines, based on a detected output of the toner sensor 49 for the unremoved toner container, whether or not the unremoved toner container is empty (step S110).

When determining that the unremoved toner container is empty ("Yes" in step S110), the controller 59 allows the display device 51 to display on the screen a message prompting to replace the empty toner container and close the access cover 25 (step S105).

After the processing in step S105, the controller 59 continues the above display so long as it determines, based on a detected output of the open/close sensor 56, that the access cover 25 has not been closed ("No" in step S106). When determining that the access cover 25 has been closed ("Yes" in step S106), the controller 59 proceeds to the processing in step S115.

When, during operation in the dual mode, only one of any pair of upper and lower toner containers containing the same color toner is unremoved and the controller 59 determines that the unremoved toner container is empty, the controller 59 suspends image formation of the image forming device 12 at the time of the determination even if the access cover 25 is not open.

Therefore, when, at the time the access cover 25 has been opened, the container loading portion 18 is in the dual mode, only one of any pair of upper and lower toner containers containing the same color toner is unremoved, and the unremoved toner container is empty, image formation has already been suspended and replacement of the empty toner container and closing of the access cover 25 are prompted in the processing in step S105.

On the other hand, when determining that the unremoved toner container as a supply source of toner is not empty ("No" in step S110), the controller 59 allows the unremoved toner container to supply the toner and allows the image forming device 12 to continue image formation (step S113). In other words, while, during operation in the dual mode, only one of any pair of upper and lower toner containers containing the same color toner is unremoved and the controller 59 determines, based on a detected output of the associated toner sensor 49, that toner remains in the unremoved toner container, the controller 59 allows the image forming device 12 to continue image formation using the unremoved toner container as a supply source of the toner.

The controller 59 allows the display device 51 to display on the screen a predetermined message prompting to load the removed toner container and close the access cover 25 (step S114). After the processing in step S114, the controller 59 proceeds to the processing in step S106. In this case, until the controller 59 determines that the access cover 25 has been closed, it allows the display device 51 to continue to display the above message prompting to load the removed toner container and close the access cover 25.

When determining in step S109 that no toner controller is removed ("Not removed" in step S109), the controller 59 determines, based on respective detected outputs of the toner sensors 49 for toner containers constituting each pair of upper and lower toner containers containing the same color toner, whether or not any one of the toner containers is empty (step S111).

When determining that one of the toner containers is empty ("Yes" in step S111), the controller 59 maintains a state where toner is supplied from the other toner container containing the same color toner as the empty toner container, and allows the image forming device 12 to continue image formation (step S113). The controller 59 allows the display device 51 to display on the screen a message prompting to replace the empty toner container and close the access cover 25 (step S114).

The controller 59 allows the display device 51 to continue the above display so long as it determines, based on a detected output of the open/close sensor 56, that the access cover 25 has not been closed ("No" in step S106). When determining that the access cover 25 has been closed ("Yes" in step S106), the controller 59 proceeds to the processing in step S115.

On the other hand, when in step S111 the controller 59 determines that any toner container is not empty ("No" in step S111), i.e., when all the toner containers loaded in the container loading portion 18 contain toner, the controller 59 forcibly suspends image formation of the image forming device 12 (step S107). In doing so, the controller 59 allows the display device 51 to display on the screen a predetermined message indicating that the image formation has been suspended (step S108). After the processing in step S108, the controller 59 proceeds to the processing in step S106.

The controller 59 allows the display device 51 to continue the above display so long as it determines, based on a detected output of the open/close sensor 56, that the access cover 25 has not been closed ("No" in step S106). When determining that the access cover 25 has been closed ("Yes" in step S106), the controller 59 proceeds to the processing in step S115.

For example, the user visually recognizes each message displayed on the display device 51 in steps S105, S108, and S114 and replaces the empty toner container or reloads the removed toner container. Thereafter, the user closes the access cover 25.

When determining in step S106 that the access cover 25 has been closed ("Yes" in step S106), the controller 59 determines whether or not an error has occurred in any of all the toner containers loaded in the container loading portion 18 (step S115).

For example, the RF tag attached to each toner container stores information indicating the color of toner contained in the toner container. The controller 59 reads, through the RFID reader 54 for each tubular housing 21 in which a toner container is inserted, the color of toner contained in the toner container from the RF tag attached to the toner container and, thus, determines whether the read color of toner matches the proper color of toner for a toner container that should be inserted into the tubular housing 21. When determining that the read color of toner does not match the proper color of toner, the controller 59 determines that an error has occurred in the inserted toner container. When determining that the read color of toner matches the proper color of toner, the controller 59 determines that no error has occurred in the toner container.

For another example, the controller 59 establishes communication, through respective RFID readers 54 for the tubular housings 21 in which respective toner containers are inserted, with the RF tags attached to the respective toner containers loaded in the tubular housings 21. When the controller 59 cannot establish communication with the RF tag attached to any of the toner containers loaded in the tubular housings 21, it determines that an error has occurred in the toner container. When the controller 59 can establish the communication, it determines that no error has occurred in the toner container.

When determining that an error has occurred in any of the toner containers ("Yes" in step S115), the controller 59 determines whether or not it allows the image forming device 12 to continue image formation (step S116). When determining that the image formation is continued ("Yes" in step S116), the controller 59 suspends the image formation of the image forming device 12 (step S117). After the processing in step S117, the controller 59 allows the display device 51 to display on the screen a predetermined message showing the toner container causing the error and prompting to replace the toner container (step S118).

When the controller 59 determines that it does not allow the image formation to be continued ("No" in step S116), the controller 59 allows the image formation of the image forming device 12 to remain uncontinued and allows the display device 51 to display the above message on the screen (step S118).

When, after the processing in step S118, the user opens the access cover 25, loads a new toner container in place of the toner container causing the error, and closes the access cover 25 ("Yes" in step S119), the controller 59 goes back to the processing in step S115.

On the other hand, when determining that no error has occurred in any of the toner containers ("No" in step S115) and determining that the image formation is suspended (Yes" in step S120), the controller 59 allows the image forming device 12 to restart the image formation (step S121). After the processing in step S121, the processing shown in FIGS. 5A and 5B ends.

When determining that the image formation is not suspended ("No" in step S120), the controller 59 allows the image formation to be continued as it is. The controller 59 repeats the processing from step S102 until a job for image formation executed in step S101 is completed. When the image formation based on the job is completed, the controller 59 ends the processing shown in FIGS. 5A and 5B.

If the access cover 25 is opened while all the toner containers loaded in all the tubular housings 21 in the container loading portion 18 contain toner (are not empty), this means that the access cover 25 is opened even though it is not that image formation cannot be continued unless any toner container is newly loaded to supply toner, i.e., even though image formation can be continued.

If the access cover 25 is opened in the above situation, a proper state where the current image formation can be continued may be changed by the user and, thus, a poor image formation (printing) may be performed or the image forming apparatus 10 may cause a failure depending on how the state is changed.

Therefore, in the above embodiment, when the access cover 25 is opened in the above situation, the image forming operation is suspended to prevent a poor image formation and the occurrence of failure. Thus, in the above embodiment, the downtime is reduced by toner supply based on a dual container system and, concurrently, in a situation where a poor image formation and the occurrence of failure may be caused, the image forming operation is suspended to prevent a poor image formation and the occurrence of failure.

In the first general technique described previously, when the toner cartridge becomes empty and needs to be replaced, a slight amount of toner remaining in the toner hopper is supplied in order to continue image formation. However, in this first technique, the image formation cannot be continued long enough with such a slight amount of toner and, therefore, the toner cartridge needs to be replaced immediately.

In the second general technique described previously, when one of the two toner containers becomes empty and needs to be replaced, toner is supplied from the other toner container in order to continue image formation. In this second technique, the image formation can be continued long and, therefore, there is no need to hurry to replace the toner cartridge.

However, the above first and second general techniques do not take any measures to prevent inconveniences that may be caused when these techniques in the future face a situation where a wrong operation may be performed on the toner cartridge or the toner container and the wrong operation has been performed.

Unlike the first and second general techniques, in the above embodiment, the image forming operation is suspended when the access cover 25 is opened. Therefore, the downtime is reduced by toner supply based on a dual container system and, concurrently, in a future situation where a wrong operation may be performed on the toner container, inconveniences that may be caused when the wrong operation has been performed can be prevented from occurring.

The present disclosure is not limited to the image forming apparatus according to the above embodiment and is applicable to a copier, a printer, a facsimile machine or other types of image forming apparatuses.

The structures, configurations, and processing described in the above embodiment with reference to FIGS. 1 to 5B are merely illustrative and are not intended to limit the present disclosure to them.

While the present disclosure has been described in detail with reference to the embodiments thereof, it would be apparent to those skilled in the art the various changes and modifications may be made therein within the scope defined by the appended claims.

What is claimed is:

1. An image forming apparatus comprising:

an image forming device that forms an image formed of a toner on a recording paper sheet;

a container loading portion capable of being loaded with a plurality of toner containers containing the toner of the same color to be supplied to the image forming device;

a plurality of toner sensors that detect whether the plurality of respective toner containers loaded into the container loading portion are in an empty state;

an access cover that makes an opening/closing movement to open or close an interior of the container loading portion in replacing each of the toner containers loaded into the container loading portion;

an open/close sensor that detects whether the access cover is open or closed; and a control device that includes a processor and functions as a controller through the processor executing a control program, wherein when, during execution of image formation of the image forming device, the open/close sensor detects that the access cover is open and none of the plurality of toner sensors detects an empty state of the associated toner container, the controller suspends the image formation of the image forming device, wherein when, during execution of image formation of the image forming device, the open/close sensor detects that the access cover is open and any of the plurality of toner sensors detects an empty state of the associated toner container, the controller allows the image forming device to continue the image formation.

2. The image forming apparatus according to claim 1, wherein when, during execution of image formation of the image forming device, a single mode where a single toner container is mounted in the container loading portion and used for the image formation is set and the open/close sensor detects that the access cover is open, the controller suspends the image formation of the image forming device.

3. The image forming apparatus according to claim 1, wherein when the toner container is replaced, the controller determines whether or not an error has occurred in a replaced toner container, when determining that an error has occurred in the replaced toner container, the controller suspends the image formation of the image forming device, and when determining that no error has occurred in the replaced toner container, the controller keeps the image formation of the image forming device from being suspended.

4. The image forming apparatus according to claim 3, further comprising an RFID reader, wherein the controller reads through the RFID reader a color of the toner from an RF tag attached to the toner container, when the read color of the toner does not match the same color, the controller determines that an error has occurred in the toner container, and when the read color of the toner matches the same color, the controller determines that no error has occurred in the toner container.

5. The image forming apparatus according to claim 1, further comprising a display device, wherein when the open/close sensor detects that the access cover is open, the controller allows the display device to display, according to the empty state of the toner container detected by each of the plurality of toner sensors, a message indicating predetermined contents of work.

* * * * *